FIG. 2
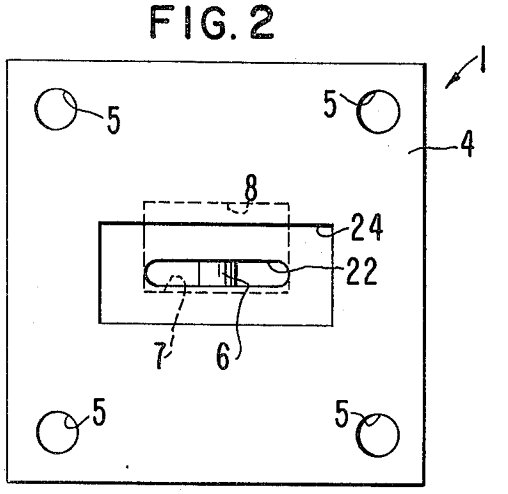
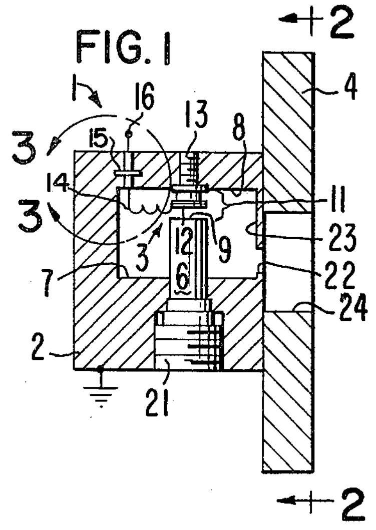
FIG. 1
FIG. 3
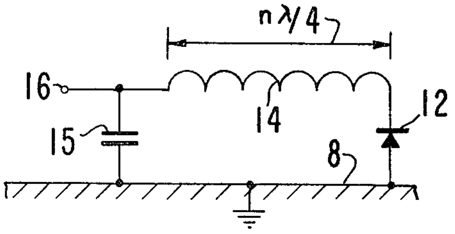
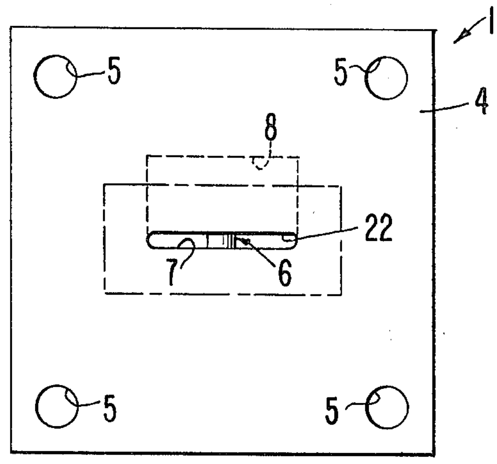
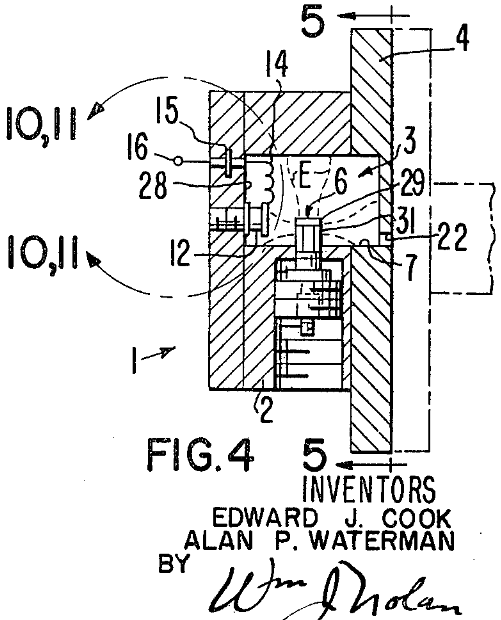
FIG. 4
FIG. 5
INVENTORS
EDWARD J. COOK
ALAN P. WATERMAN
BY Wm J Nolan
ATTORNEY INVENTORS
EDWARD J. COOK
ALAN P. WATERMAN
BY
Wm. [signature]
ATTORNEY Oct. 21, 1969 E. J. COOK ET AL 3,474,351

HIGH FREQUENCY APPARATUS EMPLOYING A DISPLACEMENT CURRENT COUPLED SOLID-STATE NEGATIVE-RESISTANCE DEVICE

Filed Jan. 25, 1968 5 Sheets-Sheet

INVENTORS
EDWARD J. COOK
ALAN P. WATERMAN
BY Wm Nolan
ATTORNEY

INVENTORS
EDWARD J. COOK
ALAN P. WATERMAN
BY [signature]
ATTORNEY

INVENTORS
EDWARD J. COOK
ALAN P. WATERMAN
BY
ATTORNEY

United States Patent Office 3,474,351

Patented Oct. 21, 1969

3,474,351

HIGH FREQUENCY APPARATUS EMPLOYING A DISPLACEMENT CURRENT COUPLED SOLID-STATE NEGATIVE-RESISTANCE DEVICE

Edward J. Cook, 12 Patton Drive, and Alan P. Waterman, 80 Union St., both of South Hamilton, Mass. 01982

Continuation-in-part of application Ser. No. 676,330, Oct. 18, 1967. This application Jan. 25, 1968, Ser. No. 700,543

Int. Cl. H03b 7/08

U.S. Cl. 331—107 16 Claims

ABSTRACT OF THE DISCLOSURE

A high frequency solid-state negative-resistance device is disclosed along with its associated microwave circuitry. The solid-state negative-resistance device, such as an impact avalanche and transmit time diode, is disposed in a capacitive gap of a microwave cavity resonator structure, defined between a conductive member within the resonator and an inside wall of the resonator. The solid-state device is arranged in the capacitive gap in such a manner that the circulating currents of the resonator are displacement current coupled to the solid-state device. A separate bias circuit is provided for applying a certain bias potential across the solid-state device for biasing the device into the negative-resistance region for interaction with the resonator currents to produce an output signal. The bias circuit preferably includes a lead forming one wire of an R.F. choke circuit for presenting a high R.F. impedance to cavity circulating currents looking from the diode toward the source of bias potential. In this manner, the bias circuit is substantially decoupled from the cavity resonator at frequencies corresponding to the resonant frequency of the cavity resonator.

In one embodiment, the solid-state device is coaxially aligned with the conductive member defining the capacitive gap. In another embodiment, the solid-state device is radially disposed relative to the conductive member. In both of the aforementioned embodiments, the displacement current coupling to the solid-state device provides a weakened R.F. coupling since much of the displacement current flows to other portions of the cavity rather than to the adjacent terminal of the diode structure. When the solid-state device is employed as the active element in a microwave oscillator the oscillator is found to have substantially improved signal-to-noise ratio as compared to such devices conductively connected such that substantially the entire circulating current of the cavity flows through the diode.

The present application is a continuation-in-part application of copending U.S. parent application Ser. No. 676,330, filed Oct. 18, 1967, now abandoned.

DESCRIPTION OF THE PRIOR ART

Heretofore, impact avalanche and transit time diodes have been employed in microwave oscillators. Such an oscillator is described and claimed in copending application 662,767, filed Aug. 23, 1967. In this prior art oscillator, the microwave circuit included a shorted section of rectangular waveguide having a conductive post structure extending across the waveguide from one broad wall to the other. The post structure was hollow and included within its hollow portion a coaxial cavity resonator having the avalanche diode conductively connected in series with the center conductor of the coaxial resonator structure. The post structure was transversely segmented to form an annular capacitive gap circumscribing the outer wall of the coaxial cavity resonator to provide capacitive coupling from the coaxial resonator to the waveguide structure. Such a microwave oscillator, operating in X-band, produced substantial power output as of 60 milliwatts, but such oscillators are characteristically noisy which makes them unsuitable for many local oscillator applications.

Also in this prior art oscillator the capacitive gap in the post structure permitted the bias potential to be applied across the diode since one terminal of the diode was conductively connected to one of the post segments and the other terminal of the diode was connected to the other post segment. Radio frequency chokes were provided associated with the post structure to permit the bias potentials to be fed to the post structures without interfering with the radio frequency circuit. Such chokes and bias structure is relatively complicated and it is desired to obtain a simplified structure for applying bias potential to the solid-state device.

SUMMARY OF THE PRESENT INVENTION

The principal object of the present invention is the provision of an improved high frequency apparatus employing a solid-state negative-resistance device.

One feature of the present invention is the provision, in a high frequency apparatus employing a solid-state negative-resistance device, of a high frequency coupling arrangement wherein the solid-state device is displacement current coupled to the high frequency currents of the high frequency circuit, whereby the noise figure for the high frequency apparatus is substantially improved.

Another feature of the present invention is the provision, in a high frequency apparatus employing a solid-state negative-resistance device for producing a high frequency output signal, of a bias circuit for applying a bias potential across the solid-state device, such bias circuit including a conductive lead forming one conductor of a bias choke circuit and arranged to present a very high impedance to the circulating currents of the high frequency circuit such that the bias circuit is isolated for high frequencies from the high frequency circuit.

Another feature of the present invention is the same as any one or more of the preceding features wherein the high frequency circuit includes a capacitive gap and the solid-state device is disposed in the capacitive gap in such a manner as to provide displacement current coupling to the solid-state device.

Another feature of the present invention is the same as the preceding feature wherein the high frequency circuit includes a cavity resonator structure having a conductive post disposed therein and defining a capacitive gap within the resonator and the solid-state device being disposed within the post defined capacitive gap.

Another feature of the present invention is the same as the preceding feature wherein the post structure is movable for tuning the frequency of the cavity resonator and, thus, the frequency of the output signal.

BRIEF DESCRIPTION OF THE DRAWINGS

Other features and advantages of the present invention will become apparent upon perusal of the following specification taken in connection with the accompanying drawings wherein:

FIG. 1 is a transverse sectional view of a microwave oscillator incorporating features of the present invention, FIG. 2 is a view of a structure of FIG. 1 taken along line 2—2 in the direction of the arrows, FIG. 3 is a schematic circuit diagram for that portion of the circuit of FIG. 1 delineated by line 3—3, FIG. 4 is a transverse sectional view of an alternative microwave osillator incorporating features of the present invention, FIG. 5 is a view of the structure of FIG. 4 taken along lines 5—5 in the direction of the arrows.

DESCRIPTION OF THE PREFERRED EMBODIMENTS

Figure 6:
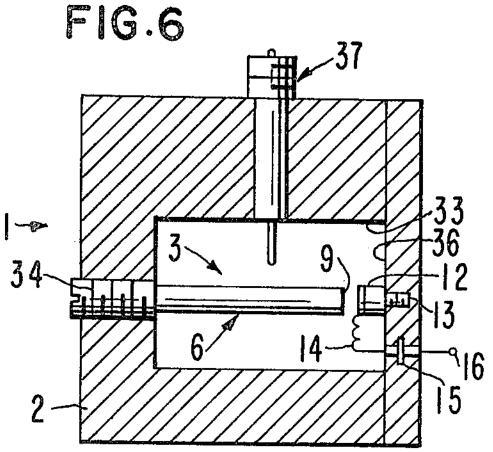
FIG. 6 is a longitudinal sectional view of an alternative oscillator embodiment incorporating features of the present invention.

Referring now to FIGS. 1 and 2, there is shown an X-band microwave oscillator 1 incorporating features of the present invention. The oscillator 1 includes a block body 2 as of copper, aluminum, or Invar containing a rectangular cavity 3 formed therein to define a cavity resonator structure. A flange assembly 4 is affixed to one side of the block 2 for connecting the oscillator 1 to standard X-band waveguide, not shown, via 4 mounting screws which thread into 4 holes 5 provided in the corners of the flange 4.

A conductive post 6 projects into the cavity resonator 3 from one broad wall 7 toward the opposed broad wall 8, the end of the conductive post at 9 is spaced from the upper conductive wall 8 to define a capacitive gap 11 therebetween. A solid-state negative-resistance device 12 such as an impact avalanche and transit time diode is disposed in the capacitive gap 11 with one terminal of the diode device 12 being conductively connected to the upper wall 8 of the cavity resonator. The other terminal of the diode 12 is capacitively coupled to the end 9 of the post 6.

Such an avalanche and transit time diode includes a locally established avalanche zone followed by an additional drift space to provide a suitable carrier transit angle. Such diodes are constructed of, for example, the mesa configuration and are usually mounted in metal-ceramic packages with the surface of the mesa bonded to the inner portion of a diode stub 13 employed for heat sinking the diode package to the upper wall 8 of the cavity resonator.

A D.C. bias circuit is connected to the other terminal of the diode 12 for applying a reverse bias thereto. More specifically, the bias circuit includes a helical conductor 14 connected at one end to the free end of the diode 12 and having its other end passing through a bypass feedthrough capacitor 15 to a terminal 16 external of the block 2 to which the bias potential is applied relative to the grounded block 2.

Referring now to FIG. 3, there is shown a schematic circuit diagram for the bias circuit. The helix 14 is disposed over a ground plane formed by the upper wall 8 of the cavity 3. The helix 14 is preferably made an odd number of quarter electrical wavelengths long at the operating frequency of the apparatus such that the bias circuit presents a very high impedance to R.F. current at the end thereof connected to the diode 12. The bypass capacitor 15 essentially short circuits the other end of the helix 14 for the high frequency currents. In a typical example at X-band, the helix 14 includes between 8 and 10 turns of 0.015 inch diameter wire to form a coil having an outer diameter of 0.060 inch which is spaced approximately 0.010 inch from the ground plane 8. The bypass capacitor 15 has a capacitance of approximately 50 picofarads and the cavity resonator and microwave oscillator is operable over the range from 8 to 12 gigahertz.

Although a helix structure 14 has been described, various alternative structures may be employed to obtain a high series inductance in the bias lead. Many of these alternative structures are readily fabricated by printed circuit techniques and are more fully described below with regards to FIGS. 10–12.

The post 6 is provided with threads 21 on its outer end such that the post may be screwed in and out of the resonator 3 for changing the capacity and inductance of the resonator and, thus, its resonant frequency over the tuning range from approximately 8 to 12 gigahertz. An elongated coupling slot 22 is provided in the side wall 23 of the resonator 3 which is adjacent the flange 4. The coupling slot 22 is centrally disposed of a waveguide aperture 24 in the flange 4 for coupling R.F. energy from the cavity 3 via the flange 4 to the output waveguide, not shown.

In operation, the diode 12 is reverse biased into breakdown by applying between 60 and 90 volts reverse voltage and 30 to 50 milliamps reverse current to the diode 12. Under these conditions, the diode 12 presents a broad range of negative resistance, at X-band microwave frequencies, to the cavity resonator 3 and the circuit breaks into oscillation producing X-band microwave output power coupled from the resonator 3 by coupling slot 22 to a load, not shown. In general, avalanche diodes 12 prefer to operate in a resonant circuit which has a loaded Q in the vicinity of 1000 and a circuit efficiency in the vicinity of 40 to 50%. Typical X-band output powers with the aforecited currents and voltages range from 40 to 120 milliwatts with efficiencies between 1 and 3%. More particularly, at 50 milliamps diode current the oscillator typically produces approximately 115 milliwatts of power at about 3% efficiency.

Referring now to FIGS. 4 and 5, there is shown an alternative embodiment of the present invention. The structure of FIGS. 4 and 5 is substantially the same as that of FIGS. 1 and 2 with the exception that the diode 12 is not mounted in axial alignment with the conductive post 6, but instead is mounted to the side of the post from a wall 28 of the cavity resonator 3. The wall 28 of the cavity 3 is formed by a plate having the diode 12 and bias circuit mounted thereon. The plate is affixed over the open end of the block 2 to define the wall 28 of the resonator 3. The flange 4 is formed as a part of the block 2 as by casting and the coupling slot 22 is cut through the flange portion 4 into the resonator 3 for coupling energy from the resonator 3 to a waveguide, not shown.

The post structure 6 is similar to that of FIG. 1 with the exception that a conductive post 29 slides axially through an axially segmented sleeve 31 defining a plurality of conductive fingers gripping the axially movable post 29. The sleeve 31 is fixedly secured to the bottom wall 7 of the resonator 3 and the conductive post 29 includes a threaded extension passing through a captured nut for producing axial movement of the post 29. The post structure 6 defines a capactive gap between the post structure 6 and the inside walls of resonator 3. Displacement current flows in the gap as represented by the electric field lines passing between the post structure 6 and the walls of the resonator 3. The diode 12 is mounted adjacent the side of the post structure 6 and is, thus, capacitively coupled to the post structure 6 and receives some of the displacement current flowing from the post stucture 6 to the remaining portion of the resonator 3. In the embodiment of FIGS. 4 and 5, this portion of the displacement current flowing to the diode 12 can be adjusted relative to the displacement current flowing to the other portions of the resonator. Thus, the coupling between the diode 12 and the microwave currents of the resonator can be substantially reduced over conduction current coupled circuits. The cavity resonator 3 is tuned by axial movement of the post 29.

Referring now to FIG. 6, there is shown an alternative embodiment of the present invention. In this embodiment, the oscillator 1 includes a clock body 2 having a cylindrical bore 33 therein defining the side walls of the cavity resonator 3. A conductive post structure 6 is axially disposed of the resonator 3. The post structure 6 includes a threaded portion 34 mating with threads in the block body 2 such that the post structure 6 may be moved axially of the cavity 3 for tuning thereof. The inner end of the post 6 defines a capacitive gap between the end 9 of the post 6 and an end wall 36 of the cavity resonator 3. The diode 12 is mounted to the end wall 36 in the capacitive gap for displacement current coupling to the diode 12. The bias circuit is substantially the same as previously described with regard to FIGS. 1–5 and includes the helical conductor 14, bypass capacitor 15 and terminal 16.

Microwave output power is coupled from the cavity 3 to a load via a coaxial line 37 having an extension of the center conductor thereof projecting into the cavity 3 to form an antenna coupling probe for capacitively coupling energy to the coaxial line 37. In operation, the oscillators 1 of FIGS. 4–6 operate in substantially the same manner as the oscillator 1 described with regard to FIGS. 1 and 2.

Figure 7:
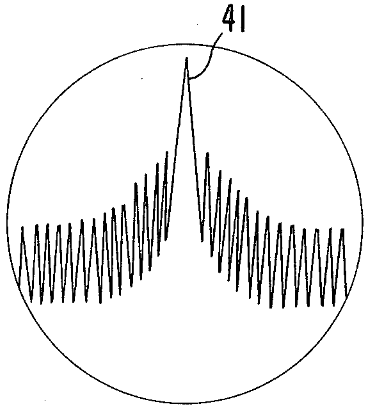
FIG. 7 PRIOR ART
FIGS. 7 and 8 are oscilloscope traces of the output spectrums of the prior art oscillator and oscillator of the present invention, respectively.

One advantage of the oscillator embodiments of the present invention which employ displacement current coupling between the currents of the cavity resonator 3 and the diode 12 is that the noise figure of the oscillator 1 is substantially improved. More particularly, the output spectrum of the prior art oscillator, employing conducting coupling of the R.F. currents of the cavity to the diode, is as shown in oscilloscope trace 41 of FIG. 7. It is seen from this oscilloscope trace that the output spectrum of the oscillator includes substantial noise components in its output spectrum.

Figure 8:
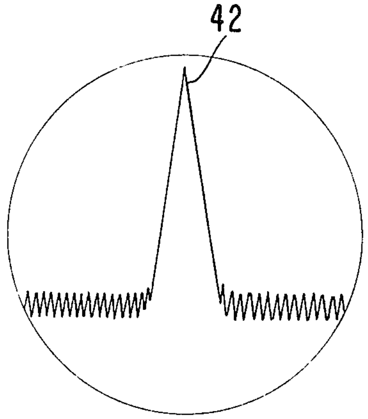

Referring now to FIG. 8, there is shown an oscilloscope trace 42 of the output spectrum of an oscillator 1 incorporating features of the present invention wherein the diode 12 is displacement current coupled to the currents of the cavity resonator 3. It is seen from the oscilloscope trace 42 that the noise components in the output spectrum have been substantially reduced compared to the center output frequency of the spectrum of FIG. 7. More specifically, the A.M. noise, in db below the carrier, for oscillator 1 of the present invention operating at 10.5 gigahertz with a power output of about 50 milliwatts varies from minus 100 db at 1 kHz. displacement from the carrier to about minus 114 db at 100 kHz. displacement from the carrier, these measurements referring to a 1 kHz. bandwidth. The F.M. noise content of the output spectrum appears to be concentrated relatively close in to the carrier frequency. More specifically, the R.M.S. equivalent noise frequency deviation for the aforecited frequency and power output is about 135 Hz. at 2 kHz. displacement from the carrier and about 60 Hz. at 4 kHz. from the carrier and about 45 Hz. at 1 MHz. from the carrier, all measurements being made with a 1 kHz. sampling bandwidth.

Figure 9:
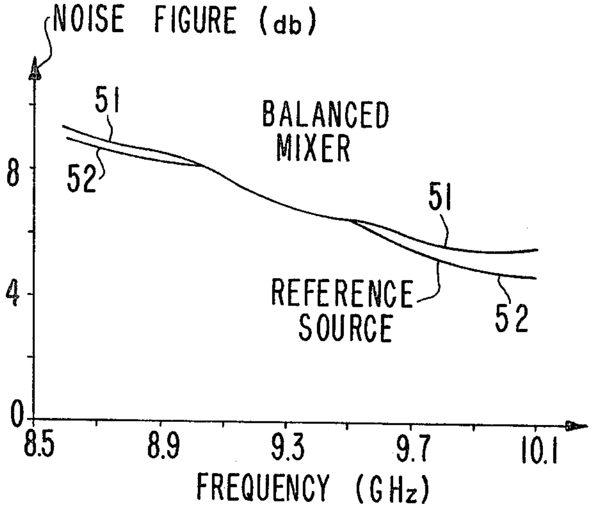
FIG. 9 is a plot of noise figure in db versus frequency in gigahertz for a receiver employing in one case a local oscillator of the present invention as employed with a balanced mixer and in a second case a conventional backward wave local oscillator.

Referring now to FIG. 9, there is shown a plot of noise figure in db versus frequency in gigahertz for a microwave receiver employing the oscillator 1 of the present invention in a balanced mixer, as compared with use of a conventional backward wave oscillator as the local oscillator. From the two curves, 51 for the oscillator 1 and 52 for the backward oscillator, it is seen that the noise figure is substantially the same for the backward wave oscillator as for the oscillator 1 of the present invention when the latter is employed in a balanced mixer. The balanced mixer serves to substantially cancel A.M. noise components present in the local oscillator signal. However, the F.M. noise components are not cancelled so that the noise figure measured is essentially the F.M. noise of the local oscillator. Thus, as can be seen from FIG. 9, for that frequency interval where the mixer balance is good and the A.M. rejection is high, there is very little difference in system noise figure between the oscillator 1 of the present invention and the reference backward wave oscillator The conclusion to be drawn from FIGS. 8 and 9 is that, for a frequency separation from the carrier of at least 30 MHz., the major contribution to noise is due to the A.M. sidebands of the oscillator 1 and not to F.M. noise, which for these frequencies has decreased to quite a low value.

Figure 10:
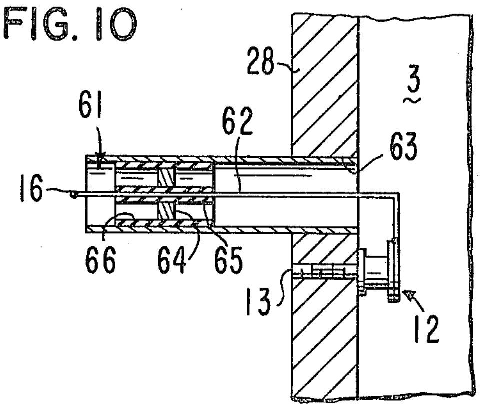
FIG. 10 is an enlarged sectional view of an alternative bias circuit similar to that portion of the structure of FIG. 4 delineated by line 10—10.

Referring now to FIG. 10, there is shown an alternative bypass circuit for applying the bias potential to the solid-state negative-resistance device 12. More particularly, a radio frequency coaxial line 61 is mounted to the end wall 28 of the cavity 3 such that the center conductor 62 of the coaxial line passes through an opening 63 in the end wall 28 and is connected to the innermost terminal of the solid-state device 12. An annular tuning slug 64, as of copper or brass, is axially slideable of the center conductor 62 to provide an adjustable shunt capacity for the coaxial line 61. The slug 64 serves to produce a radio frequency short circuit in the coaxial line 61. A pair of insulating sleeves 65 and 66 as of Teflon are coaxially inserted between the conductive tuning slug 64 and the inner and outer conductors of the coaxial line 61 to prevent the tuning slug from forming an electric D.C. short circuit for the coaxial line section 61. The D.C. bias potential is applied to the center conductor at terminal 16 for biasing the diode device 12.

The tuning slug 64 is positioned at a distance from the diode within the coaxial line 61 such that it is an odd number of electrical quarter wavelengths along the coaxial line 61 between the tuning slug 64 and the diode 12 to present, at the diode 12, an open circuit for microwave energy at the operating frequency of the cavity 3. The bias circuit of FIG. 10 has the advantage of being relatively simple in construction and being adjustable to provide a minimum of R.F. coupling between the cavity 3 and the bias circuit.

In operation, the capacitive tuning slug 64 is adjusted such that the coupling at the microwave frequencies between terminal 16 on the coaxial line 61 and the cavity 3 is less than 25% and preferably on the order of 5% or less. In this manner, R.F. noise components present in the bias circuit, as produced by the avalanche effects of the diode 12, are not substantially coupled to the cavity 3 to excite noise in the output signal derived from the cavity 3.

Figure 11:
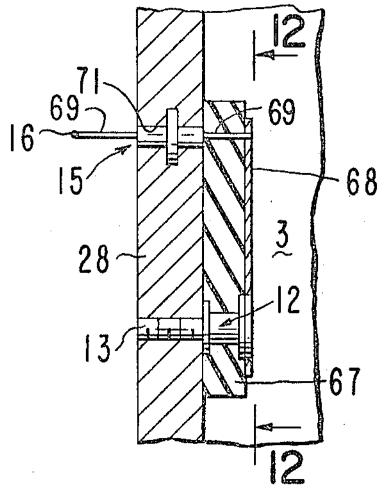
FIG. 11 is an enlarged sectional view of an alternative portion of the structure of FIG. 4 delineated by line 11—11 and showing an alternative bias circuit of the present invention.

Referring now to FIG. 11 there is shown a preferred bias circuit of the present invention. In this circuit, the diode device 12 is mounted within a bore in a dielectric printed circuit board 67, as of glass, Teflon, etc., affixed to the wall 28 of the cavity 3. A bias conductor 68 is metallized or otherwise formed or bonded onto the circuit board 67 for making connection between the diode 12 and a bias lead 69 which passes through a bore 71 in the wall 28. A bypass capacitor 15 is provided in the bias circuit at the position where the lead 69 passes through the bore 71.

The metallized lead 68 includes a ring portion 72 which makes electrical contact to one side of the diode 12 and which is connected as by soldering to the lead 69 at the other end of the metallized lead 68. The electrical length of the bias circuit from the diode 12 to the bypass capacitor 15 is approximately a quarter wavelength long to present a high impedance to microwave energy at the diode 12 such that the bias circuit is essentially decoupled from the R.F. circulating currents of the cavity 3. The degree of R.F. coupling, at the resonant operating frequency of the cavity 3, between terminal 16 and the output 22 of the cavity 3 is less than 25% and preferably less than 5%. This reduces coupling of R.F. noise components produced in the bias circuit through the cavity 3 to its output terminal 22.

Figure 12:
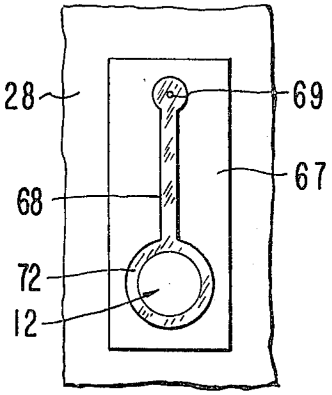
FIG. 12 is a sectional view of the structure of FIG. 11 taken along line 12—12 in the direction of the arrows.

An advantage of the oscillator embodiment of the present invention is the simplicity of the bias circuit of FIGS. 11 and 12. More specifically, the metallized conductor 68 is very easily fabricated and its connection to the diode 12 and to the feedthrough capacitor 15 provides a very simple bias network greatly simplifying the fabrication of microwave circuits employing such diodes 12. In this regard, bias lead 68 may be formed by conventional printed circuit techniques.

The reason why the oscillator 1 of the present invention provides a substantially improved noise figure is that the displacement current coupling provides a weakened R.F. coupling to the diode 12 since only a fraction of the total R.F. electric fields lines terminate on the diode. Accordingly, the cavity resonator 3 is considered to be like a large flywheel kept in oscillation by the relatively small current added by the diode 12. The flywheel effect serves to cancel out the noise produced by the diode 12.

Figure 13:
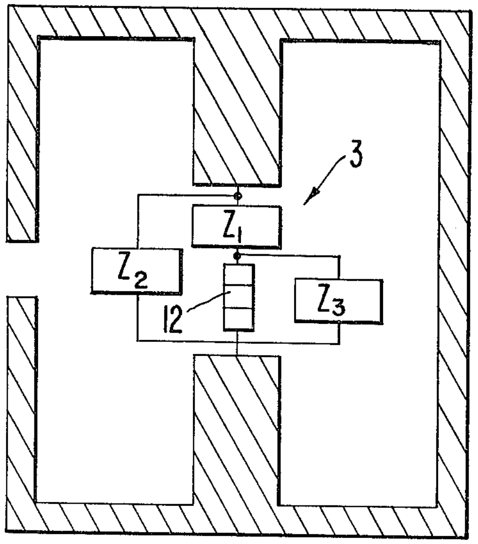
FIG. 13 is a schematic circuit diagram, partly in block diagram form, of a diode embedded in a cavity resonator according to the present invention.

The microwave circuits of the present invention and described above all include a fundamental mode resonator in which provision has been made within the resonator for bypassing a portion of the circulating current around the diode 12 so as to decrease the coupling between the diode 12 and the cavity 3 as compared with prior art arrangements wherein a major portion of the circulating current passed through the diode 12. The bypass provision is indicated in FIG. 13 and includes a divider network built around the diode 12 and comprises the series and shunt impedances $Z_1$, $Z_2$ and $Z_3$. By adjusting these series and shunt impedances $Z_1$, $Z_2$ and $Z_3$, the R.F. coupling of the diode 12 to the circulating current of the cavity resonator can be readily adjusted.

Although this divider network is far from an ideal impedance transformer, it does provide a means for readily varying the diode coupling and achieving a considerable range of impedance variation. In practice, the series and shunt impedances are inserted in lumped form so as to keep the circuit simple. Even so, the distributed effects are considerable, and at the present time there is no exact measurement of the impedance which these networks reflect to the diode.

Figure 14:
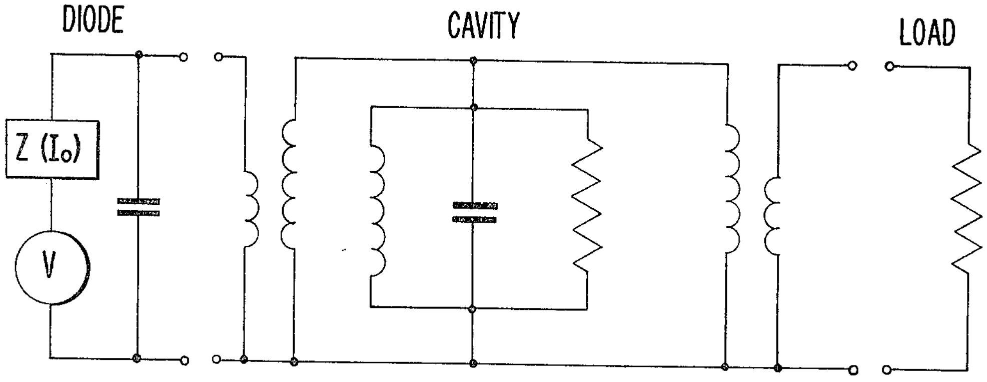
FIG. 14 is an equivalent circuit diagram for the cavity circuit of FIG. 13.
Figure 15:
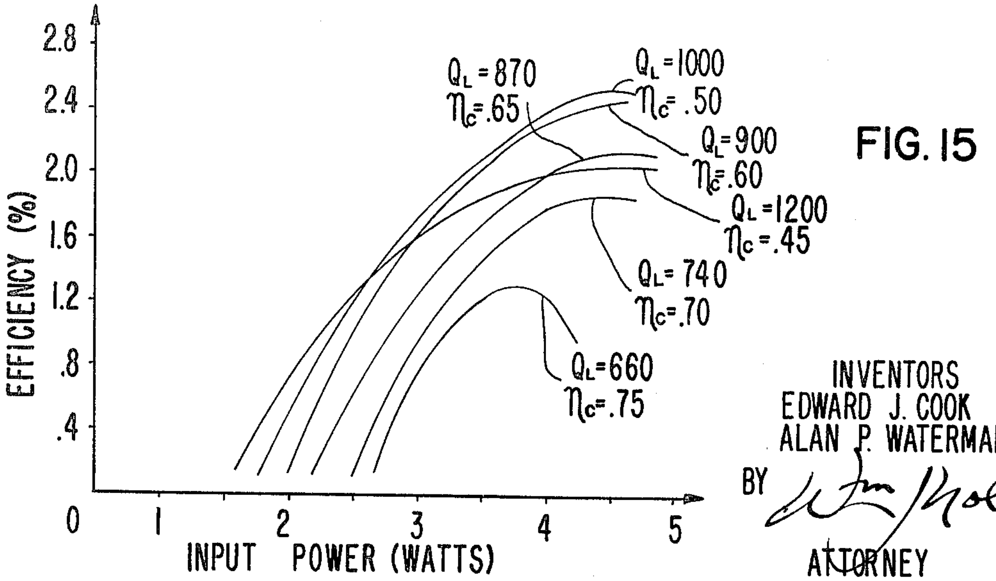
FIG. 15 is a plot of oscillator efficiency versus input power as a function of output coupling ($Q_L$ and circuit efficiency $\eta_c$)
Figures 16, 17:
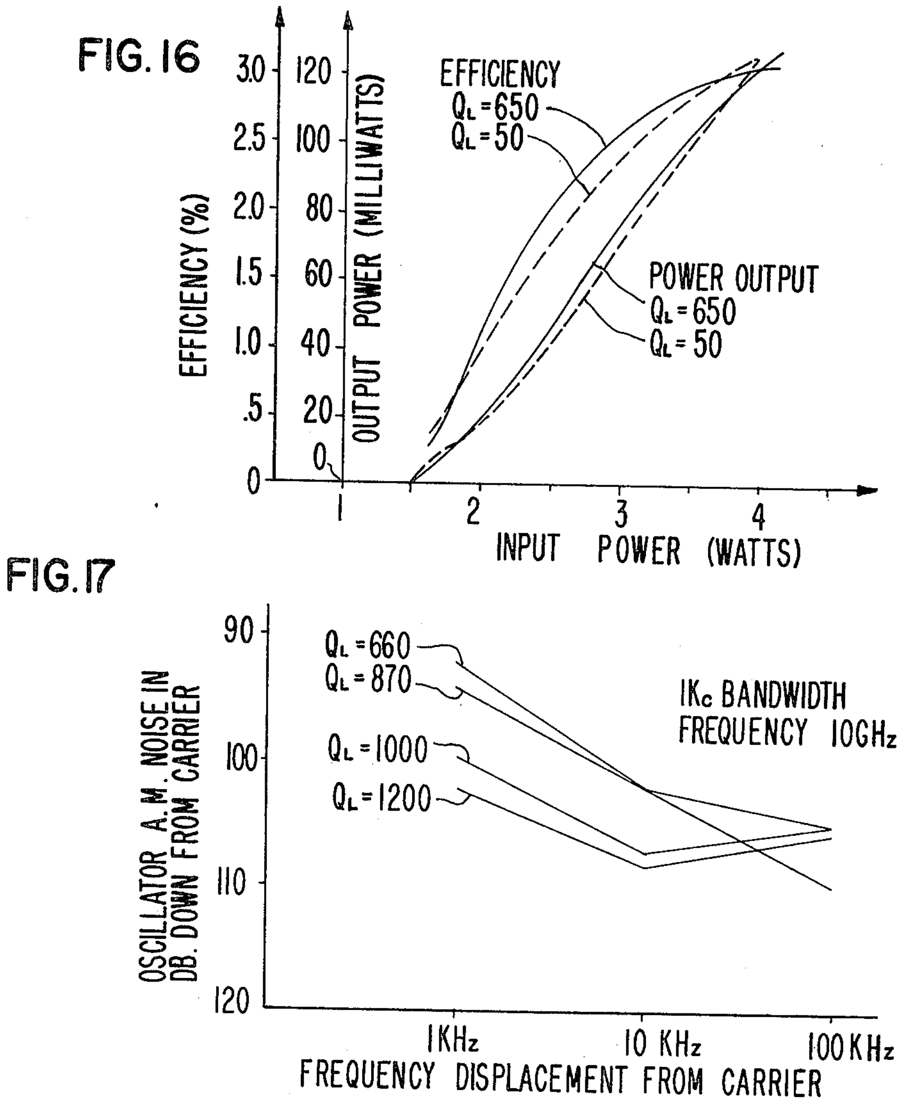
FIG. 16 is a plot of oscillator power output and efficiency versus input power for widely different values of $Q_L$.
FIG. 17 is a plot of oscillator A.M. noise versus frequency displacement from the carrier as a function of $Q_L$.

Conceptually, then, the present circuit can be viewed schematically as shown in FIGURE 14. The diode is to be considered coupled to the cavity resonator through a transformer by which the impedance level can be selected, and the cavity in turn is coupled to the outside load through another impedance transformer. With this kind of arrangement, it is theoretically possible to effectively match from the diode 12 to the load through any arbitrary cavity Q. In practice, comparable power and efficiency have been achieved over a loaded Q ($Q_L$) range of 50 to 1200, but with some adjustment of the divider network necessary. FIGURE 15 shows the typical output efficiency of an oscillator with constant diode to circuit coupling and variable coupling between the cavity 3 and load. Since the input transformer is fixed, one would expect the power transfer to be optimized when the output coupling reaches a value where the combined cavity and load losses are matched into the generator impedance. In the example shown, this occurred at a $Q_L$ of 1000 and a circuit efficiency of 50 percent. In FIGURE 16, the power output and efficiency of the same diode are shown for radially different imbedments of the diode within the cavity. One resulted in a loaded Q of 50, and the other in a loaded Q of 650. The effectiveness of the matching is shown through the nearly identical efficiency and power output characteristics.

Figure 18:
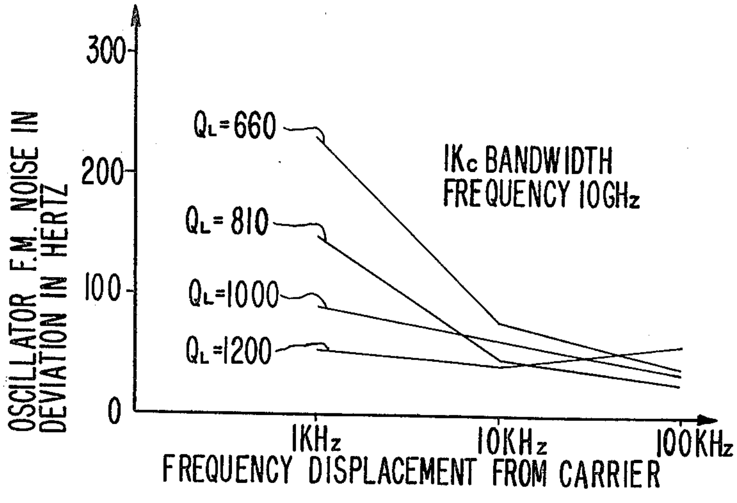
FIG. 18 is a plot of oscillator F.M. noise versus frequency displacement from the carrier as a function of $Q_L$.

In order to appreciate the difference which the higher Q makes in the noise performance, consider FIGS. 17 and 18. FIG. 17 shows the A.M. noise in a 1 kHz. bandwidth versus displacement from the carrier for an oscillator in which the $Q_L$ is varied by means of the output coupling over a range of roughly 600 to 1200. As expected, there is a continued improvement in noise performance as Q is increased. The slight increase in noise shown for the 10 kHz. to 100 kHz. interval is not normally seen with these devices, but was present in this particular run.

FIG. 18 shows the equivalent F.M. noise measurements for the same diode and circuit over the same sideband range, where the continued improvement in F.M. noise with increasing Q is even more apparent.

Although the solid-state negative-resistance device 12 has been described as an avalanche diode, other solid-state negative-resistance devices at microwave frequencies may also be employed in the embodiments of the present invention. Such other negative-resistance solid-state devices include Gunn effect diodes, LSA mode diodes and other transit time devices.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a high frequency apparatus, means forming a high frequency resonant circuit capable of supporting high frequency currents, means forming a solid-state device capable of exhibiting negative-resistance under certain conditions of applied bias potential, said device being coupled to said high frequency resonant circuit, means forming a bias circuit for applying the certain bias potential to said solid-state device to cause said device to present a negative-resistance to said high frequency resonant circuit to produce a high frequency output, THE IMPROVEMENT COMPRISING, means for displacement current coupling said solid-state device to the high frequency currents of said high frequency resonant circuit.

2. The apparatus of claim 1 wherein said high frequency resonant circuit has a portion defining a capacitive gap, said device being disposed in said capacitive gap such that some of the high frequency capacitive displacement current of said high frequency circuit flows across said capacitive gap to said device.

3. The apparatus of claim 1 wherein said means forming a bias circuit for applying the bias potential to said solid-state device includes, means forming a high series inductance in one conductor of said bias circuit, and said high series inductance means including a portion extending into said high frequency resonant circuit.

4. The apparatus of claim 3 wherein said high series inductance means is an odd number of quarter electrical wavelengths long at the high output frequency.

5. The apparatus of claim 4 including means forming a bypass capacitor connected at one end of said high series inductance means to the other conductor of said bias circuit for bypassing said high series inductance of said bias circuit for the high frequency energy.

6. The apparatus of claim 1 wherein said high frequency resonant circuit includes a cavity resonator.

7. The apparatus of claim 2 wherein said high frequency circuit includes a cavity resonator, said cavity having a conductive post therein, said conductive post defining said capacitive gap with at least one inside wall of said cavity resonator structure.

8. The apparatus of claim 7 wherein said conductive post is axially movable within said cavity resonator for tuning the resonant frequency of said cavity resonator and, thus, the output frequency of the high frequency apparatus.

9. The apparatus of claim 7 wherein said solid-state device is disposed in axial alignment with said conductive post.

10. The apparatus of claim 7 wherein said solid-state device is disposed to the side of said conductive post between a side of said conductive post and an inside wall of said cavity resonator.

11. The apparatus of claim 7 wherein said solid-state negative-resistance device is an avalanche type diode.

12. The apparatus of claim 4 wherein said high series inductance means includes a dielectric slab, and a high series inductance conductor bonded to said dielectric slab.

13. The apparatus of claim 3 wherein the radio frequency coupling from said bias circuit through said resonant circuit to the output terminal of said resonant circuit, at the resonant frequency of said high frequency resonant circuit, is less than 25%.

14. In a high frequency apparatus, a cavity resonator, means forming a solid-state device capable of exhibiting negative-resistance under certain conditions of applied bias potential, said device being disposed within said cavity resonator and coupled to the circulating currents of said cavity resonator to produce a high frequency output, THE IMPROVEMENT COMPRISING, means forming a bypass for causing a preponderance of the radio frequency circulating current of said cavity resonator to be shunted around said device, whereby said device is but weakly coupled to said cavity resonator.

15. The apparatus of claim 14 wherein said cavity resonator as coupled to said device has a loaded Q greater than 800.

16. The apparatus of claim 15 wherein said device is an impact avalanche and transit time diode.

References Cited

UNITED STATES PATENTS 3,254,309 5/1966 Miller ---------------- 331—96

JOHN KOMINSKI, Primary Examiner

U.S. Cl. X.R.

331—96, 115